United States Patent
Granger (10) Patent No.: US 10,639,738 B1
(45) Date of Patent: *May 5, 2020

(54) POSITION SENSING A LOCATION PIN IN A WELDING ELECTRODE

(71) Applicant: NBN Innovations, LLC., Fraser, MI (US)

(72) Inventor: Timothy P. Granger, Fraser, MI (US)

(73) Assignee: NBN Innovations, LLC, Fraser, MI (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/886,047

(22) Filed: Feb. 1, 2018

Related U.S. Application Data (63) Continuation of application No. 15/692,074, filed on Aug. 31, 2017, now Pat. No. 9,914,181, which is a continuation of application No. 14/867,600, filed on Sep. 28, 2015, now Pat. No. 9,789,562.

(51) Int. Cl.
*B23K 11/25* (2006.01)
*B23K 11/31* (2006.01)

(52) U.S. Cl.
CPC .......... *B23K 11/253* (2013.01); *B23K 11/255* (2013.01); *B23K 11/311* (2013.01); *B23K 11/315* (2013.01); *B23K 11/317* (2013.01)

(58) Field of Classification Search
CPC ..... B23K 11/25; B23K 11/253; B23K 11/255; G01D 5/02; G01D 5/04
See application file for complete search history.

(56) References Cited

U.S. PATENT DOCUMENTS

| | | | |
|---|---|---|---|
| 2,761,956 A | 9/1956 | Potter et al. | 219/130 |
| 5,493,093 A | 2/1996 | Cecil | 219/110 |
| 5,632,912 A | 5/1997 | Cecil | 219/110 |
| 5,742,161 A * | 4/1998 | Karte | G01B 7/003 324/207.12 |
| 5,988,486 A | 11/1999 | Kobayashi et al. | 228/212 |
| 6,020,569 A | 2/2000 | Cecil et al. | 219/109 |
| 6,303,893 B1 | 10/2001 | Perks | 219/86.24 |
| 6,305,234 B1 * | 10/2001 | Thies | G01D 5/145 250/231.18 |
| 6,624,379 B1 | 9/2003 | Thornton | 219/110 |
| 6,875,946 B2 | 4/2005 | Hidaka | 219/86.41 |

(Continued)

FOREIGN PATENT DOCUMENTS

| | | | | |
|---|---|---|---|---|
| EP | 1118417 A1 | 1/2001 | ............ | B23K 11/11 |
| JP | 05237667 A * | 9/1993 | | |

(Continued)

OTHER PUBLICATIONS

"Inductive Angle Sensor With Analog Output", Ri30P2-QR14-LiU5X2-0, 3RS4, Truck, Inc., 2011, 3 pages.

*Primary Examiner* — Walter L Lindsay, Jr.
*Assistant Examiner* — Milton Gonzalez
(74) *Attorney, Agent, or Firm* — Quinn IP Law (57) ABSTRACT

An apparatus includes a housing, a mechanism and a sensor. The housing may be configured to receive a weld head. The mechanism may be attached to the housing and configured to convert a position of a location pin relative to the housing into an angular rotation. The sensor may be coupled to the mechanism and configured to generate a value representative of the position of the location pin based on the angular rotation.

18 Claims, 9 Drawing Sheets

(56) References Cited

U.S. PATENT DOCUMENTS

| | | | |
|---|---|---|---|
| 6,906,276 B2 | 6/2005 | Kaeseler et al. | 219/86.41 |
| 7,170,025 B2 | 1/2007 | Gonzalez | 219/86.25 |
| 7,282,664 B2 | 10/2007 | Cabanaw | 219/119 |
| 7,915,889 B2 | 3/2011 | Shintani et al. | 324/207.24 |
| 8,513,561 B2 | 8/2013 | Kuechenmeister | 219/117.1 |
| 9,440,308 B2 | 9/2016 | Roddy | |
| 2007/0164077 A1 | 7/2007 | Pulido | 228/10 |
| 2017/0239747 A1 | 8/2017 | Koscielski | |

FOREIGN PATENT DOCUMENTS

| | | | | |
|---|---|---|---|---|
| JP | 07100660 A | * | 4/1995 | |
| JP | H07299571 | | 11/1995 | B23K 11/24 |
| WO | WO01/58636 A1 | | 8/2001 | B23K 11/25 |
| WO | WO2008/144873 A1 | | 12/2008 | B23P 15/00 |

* cited by examiner

POSITION SENSING A LOCATION PIN IN A WELDING ELECTRODE

This application relates to U.S. Ser. No. 15/692,074, filed Aug. 31, 2017, which relates to U.S. Ser. No. 14/867,600, filed Sep. 28, 2015, now U.S. Pat. No. 9,789,562, which are incorporated by reference in their entirety.

FIELD OF THE INVENTION

The present invention relates to resistance welding generally and, more particularly, to a method and/or architecture for position sensing a location pin in a welding electrode.

BACKGROUND OF THE INVENTION

Detecting a proper orientation of a weld fastener before applying a welding current is an issue in conventional welding assemblies. A mis-orientated or incorrect weld fastener can cause destruction of the welding electrodes, destruction of the weld fastener and destruction of the weld tooling. Any such destruction causes delays in production and incurs an expense in replacing the destroyed parts. Welding with the wrong fastener, or welding with the correct fastener but in the wrong orientation, results in rejections of the welded fasteners, failures in the welded fasteners in service and rework to replace the mis-welded fasteners.

It would be desirable to implement position sensing a location pin in a welding electrode.

SUMMARY OF THE INVENTION

The present invention concerns an apparatus including a housing, a mechanism and a sensor. The housing may be configured to receive a weld head. The mechanism may be attached to the housing and configured to convert a position of a location pin relative to the housing into an angular rotation. The sensor may be coupled to the mechanism and configured to generate a value representative of the position of the location pin based on the angular rotation.

The objects, features and advantages of the present invention include providing position sensing a location pin in a welding electrode that may (i) monitor an orientation of a weld part, (ii) monitor a presence/absence of the weld part, (iii) sense a position of a location pin in a way immune to electromagnetic fields generated during the welding process, (iv) incorporate inexpensive monitoring components, (v) replicate a height of conventional electrodes without the position sensing, (vi) incorporate a limit switch, (vii) incorporate a voltage detector, (viii) incorporate a visual indicator, (ix) incorporate an electrical angle sensor, (x) incorporate a mechanical angle sensor, (xi) incorporate an optical angle sensor, (xii) incorporate a pneumatic angle sensor, (xiii) provide ease of maintenance and/or (xiv) easily adapt to existing weld assemblies.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Various embodiments of the present invention may provide one or more monitoring techniques of a position, an orientation and/or an absence of a part to be welded before welding begins. The monitoring techniques are generally immune to electromagnetic fields generated by a welding current applied by a welding electrode to the part to be welded. A welding electrode incorporating the monitoring techniques may have a height matching or similar to that of existing welding electrodes without the monitoring techniques. Where incorporated into one of a pair of welding electrodes (e.g., a lower and/or stationary electrode), the welding electrodes may be easily adapted to existing welding machines and provide ease of maintenance.

A location pin of the welding electrode may move linearly in a housing to determine an orientation and/or absence of the part to be welded. A position of the location pin may be monitored (or sensed) by converting the position of the location pin into an angular position and measuring the angular position. The monitoring techniques may incorporate low-cost sensors. The sensors generally include, but are not limited to, a limit switch, a voltage detector, a visual indicator, an electrical angle sensor, a mechanical angle sensor, an optical angle sensor and/or a pneumatic angle sensor. Other sensors that measure a rotation of a shaft may be implemented to meet the criteria of a particular design application.

Figure 1:
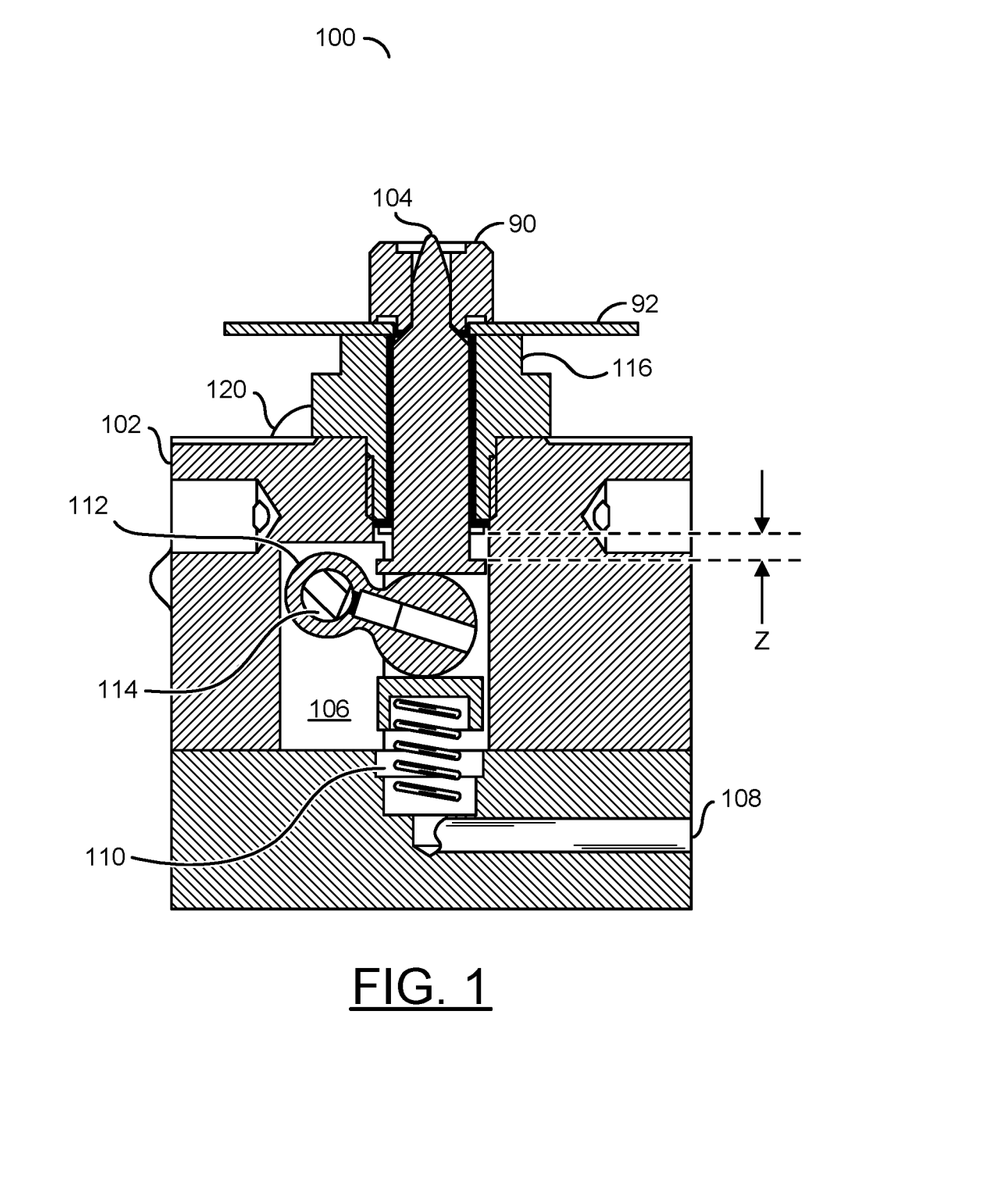
FIG. 1 is a cross-sectional exposed view of an apparatus in accordance with a preferred embodiment of the present invention.

Referring to FIG. 1, a cross-sectional exposed view of an example implementation of an apparatus 100 is shown in accordance with a preferred embodiment of the present invention. The apparatus (or system) 100 may implement a welding electrode. The apparatus 100 may be configured to weld a fastener (or part) 90 to an object (or component) 92. The welding may be achieved by electrical resistance welding.

The apparatus 100 generally comprises a housing (or assembly) 102, a location pin (or assembly) 104, a cavity (or bore) 106, a port (or bore) 108, a spring (or assembly) 110, a rotary lever (or arm) 112, a shaft (or rod) 114, a weld head (or electrode) 116, a rotary indicator (see FIG. 2) 118 and an encoder (or monitor) 120. In operation, the fastener 90 and the object 92 are brought into contact with the weld head 116 at an end of the housing 102. The location pin 104 is generally received in an opening of the fastener 90 and an opening of the object 92. A linear distance that the location pin 104 travels into the opening of the fastener 90 generally indicates if the fastener 90 is selectively (or alternatively) in a proper orientation, an improper orientation (e.g., upside down), missing and/or is an incorrect part.

The location pin 104 may be pushed (or biased) toward the fastener 90 by air pressure created in the cavity 106 through the port 108 and/or by the spring 110. As the assembly 100 and the fastener 90/object 92 are brought together, the location pin 104 generally contacts the fastener 90. A force created between the fastener 90 and the location pin 104 may cause the location pin 104 to move into the housing 102 and compress the spring 110. The movement may stop when the weld head 116 contacts the object 92. The weld head 116 generally conveys the welding current to the object 92.

The rotary lever 112 is generally disposed between the location pin 104 and the spring 110. The linear motion of the location pin 104 may be converted (or translated) into an angular motion of the rotary lever 112 about the shaft 114. A center of rotation of the shaft 114 is generally offset from a centerline of the location pin 104 (e.g., offset to the left in the figure). The sensor 120 may measure an angle (e.g., an absolute angle or a relative angle) of the shaft 114 in reference to the housing 102. An angle value of the measured angle of the shaft 114 is generally proportional to a distance (e.g., Z) traveled by the location pin 104 in reference to the housing 102 while the fastener 90/the object 92 are moved from an initially-contacting (or load) position to a welding position. The distance (or position) Z that the location pin 104 travels may be used to determine if the welding process may be allowed (e.g., a proper fastener 90 in a proper orientation) or should be denied (e.g., wrong fastener, missing fastener, incorrect orientation, and/or any other error).

Figure 2:
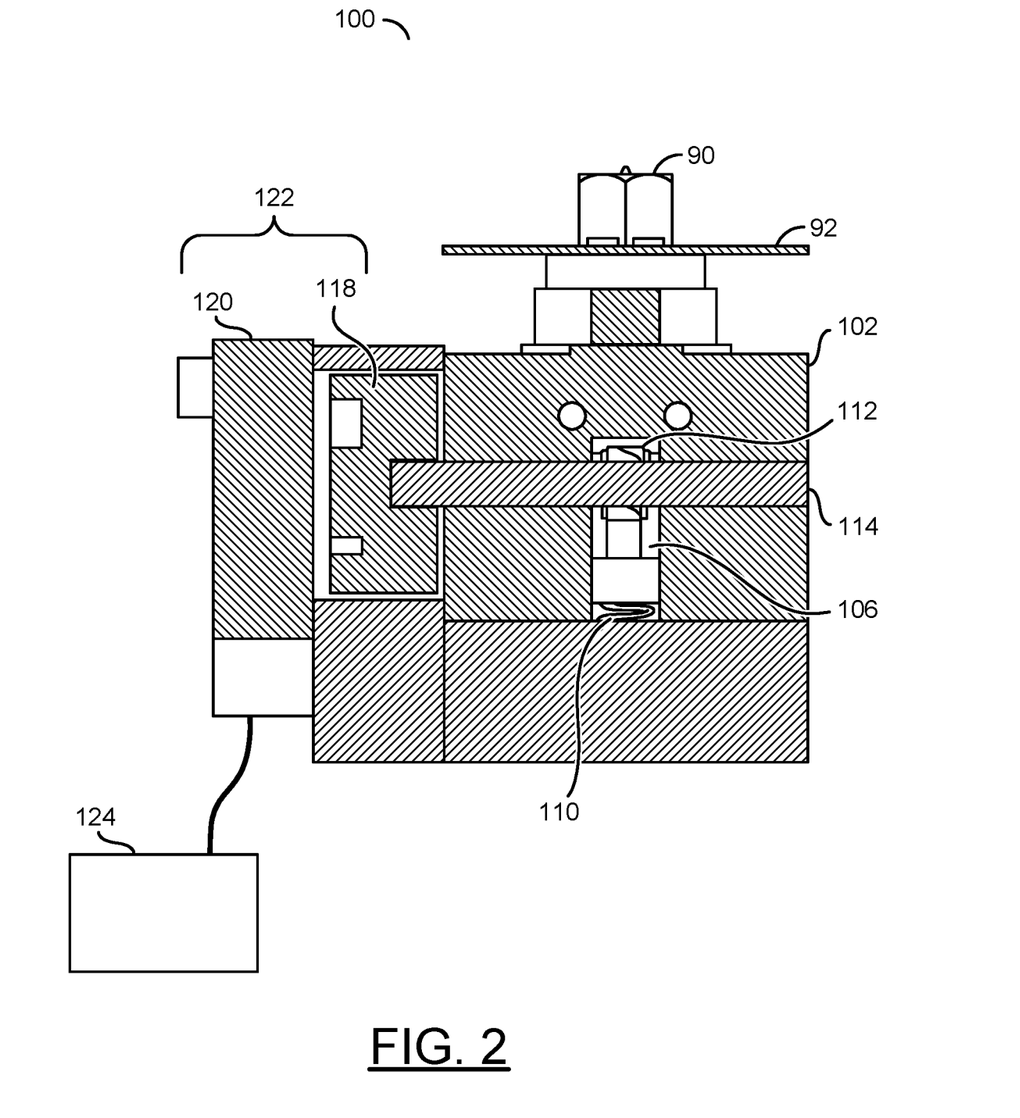
FIG. 2 is another cross-sectional view of the apparatus.

Referring to FIG. 2, another cross-sectional view of the apparatus 100 is shown. A combination of the rotary indicator 118 and the encoder 120 may form a sensor (or detector) 122. The sensor 122 may be in communication with a circuit 124 via one or more electrical signals.

The rotary indicator 118 may be coupled to the shaft 114. In various embodiments, the coupling may be a direct connection or an indirect connection between the rotary indicator 118 and the shaft 114. The coupling generally causes the rotation of the shaft 114 to be conveyed to the rotary indicator 118. The angular position of the rotary indicator 118 relative to the housing 102 may be identical to the angular position of the shaft 114. The encoder 120 may be mounted on the housing 102 in alignment with the rotary indicator 118.

In some embodiments, the rotary indicator 118 may be implemented as a positioning element. For example, the rotary indicator 118 may be a positioning element (e.g., part number P1-Ri-SR14, available from Turck Inc., Minneapolis, Minn.) for inductive angle sensors. In some embodiments, the encoder 120 may be implemented as an inductive angle sensor (e.g., part number Ri30-P2-QR14, available from Truck Inc.) In various embodiments, the rotary indicator 118 and the encoder 120 may be arranged in a non-contact configuration.

The sensor 122 generally provides an oscillator circuit coupling between a transducer in the encoder 120 and a sensor in the rotary indicator 118. The oscillator circuit coupling may be immune to electromagnetic interference, such as the electromagnetic fields generated during the welding process. The sensor 122 may generate an analog electrical signal proportional to an angle of the rotary indicator 118 relative to the encoder 120. The analog electrical signal may be digitized in the circuit 124 to a finite resolution (e.g., 12 bits). At 12-bits resolution, the circuit 124 may monitor an angle value of the shaft 114 to a few hundredths of a degree (e.g., 0.09 degrees). Additional details of the sensor 122 may be found in datasheet "Inductive Angle Sensor With Analog Output", Ri30P2-QR14-LiU5X2-0,3-RS4, by Turck Inc., which is hereby incorporated by reference in its entirety. Other types of electrical angle sensors may be implemented to meet the criteria of a particular design application.

The circuit 124 may implement a detector circuit. The circuit 124 is generally operational to measure the electrical signal generated by the sensor 122. Based on the measurement, the circuit 124 may provide status of the location pin 104 position to a weld control circuit (not shown). The weld control circuit generally controls the welding current applied to the weld head 116. The status may include, but is not limited to, a proper orientation of the fastener 90, an incorrect orientation of the fastener 90, the fastener 90 is missing and/or an incorrect fastener is detected. For example, the angular position measured by the sensor 122 may be translated in the circuit 124 to a linear position of the location pin 104. Where the location pin 104 is in a "correct orientation" position range, the circuit 124 may signal the weld control circuit that the fastener 90/object 92 are ready to weld. Where the location pin 104 is in an "incorrect orientation" position range, the circuit 124 may signal the weld control circuit that the fastener 90 is present and in the wrong orientation. Where the location pin 104 is in one or more possible "wrong part" position ranges, the circuit 124 may signal the weld control circuit that an incorrect fastener is loaded. Where the location pin 104 is in a "missing" position range, the circuit 124 may signal the weld control circuit that the fastener 90 and/or object 92 is missing. Other position ranges of the location pin 104 may be implemented to meet the design criteria of a particular application.

Figure 3:
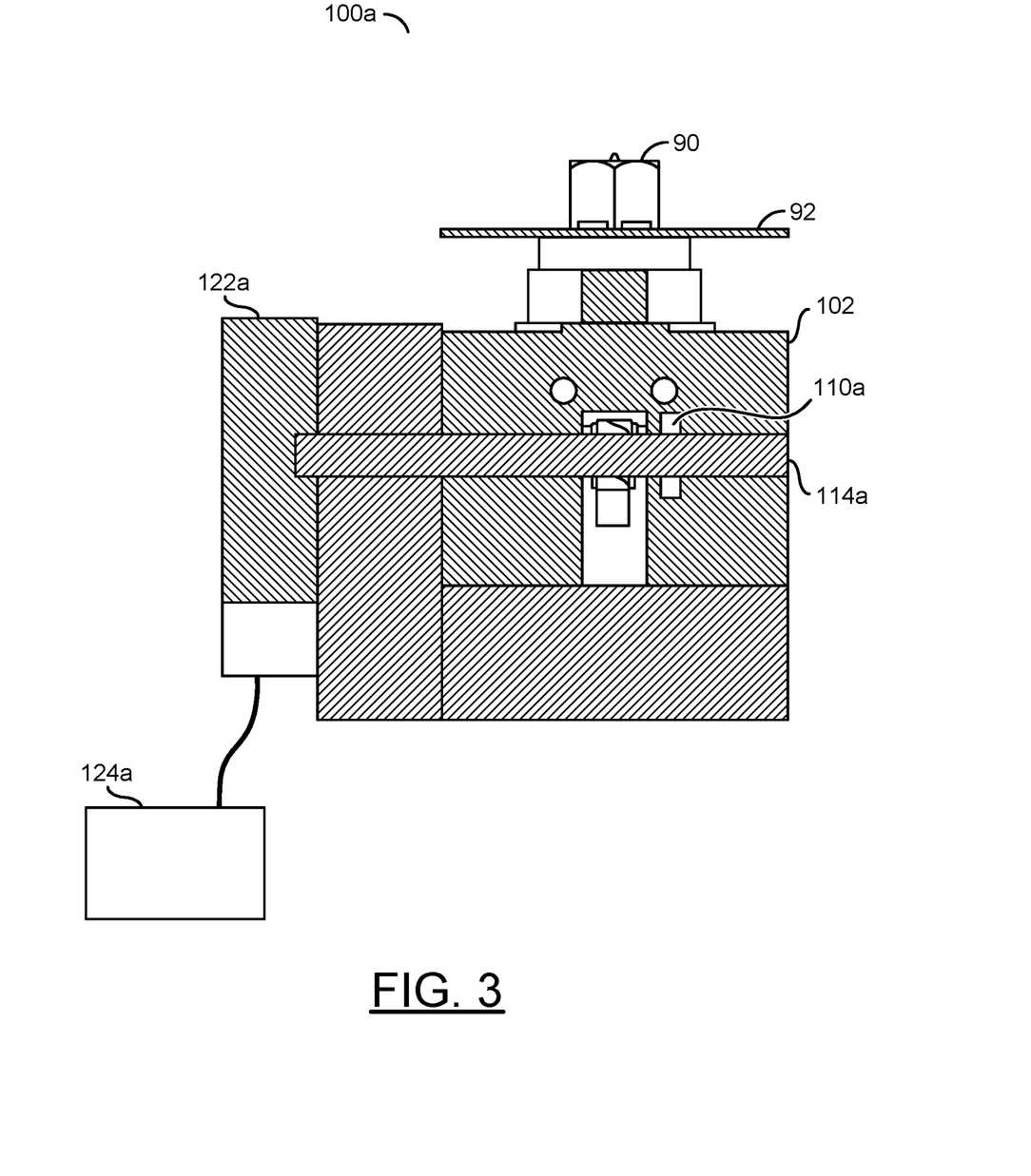
FIG. 3 is a cross-sectional view of another apparatus.

Referring to FIG. 3, a cross-sectional view of an example implementation of an apparatus 100a is shown. The apparatus 100a may be a variation of the apparatus 100. The apparatus 100a generally includes the housing 102, a spring (or assembly) 110a, a shaft (or rod) 114a and a sensor (or detector) 122a. The sensor 122a may be in electrical communication with a circuit 124a. The spring 110a (e.g., a rotary spring) may be a variation of the spring 110. The shaft 114a may be a variation of the shaft 114. The sensor 122a may be a variation of the sensor 122. The circuit 124a may be a variation of the circuit 124. Other elements of the apparatus 100 may be included in the apparatus 100a.

The sensor 122a may implement an electrical angle sensor. The sensor 122a may be operational to convert the angular position of the shaft 114a into an angle value. The angle value may be presented in one or more electrical signals to the circuit 124a. The shaft 114a may be longer than the shaft 114. The shaft 114a may extend outside the housing 102 and into the sensor 122a. The circuit 124a may be operational to measure the angle value measured by the sensor 122a. The circuit 124a may be operational to provide the status indications to the weld control circuit based on the measured angle value, similar to the circuit 124.

Figure 4:
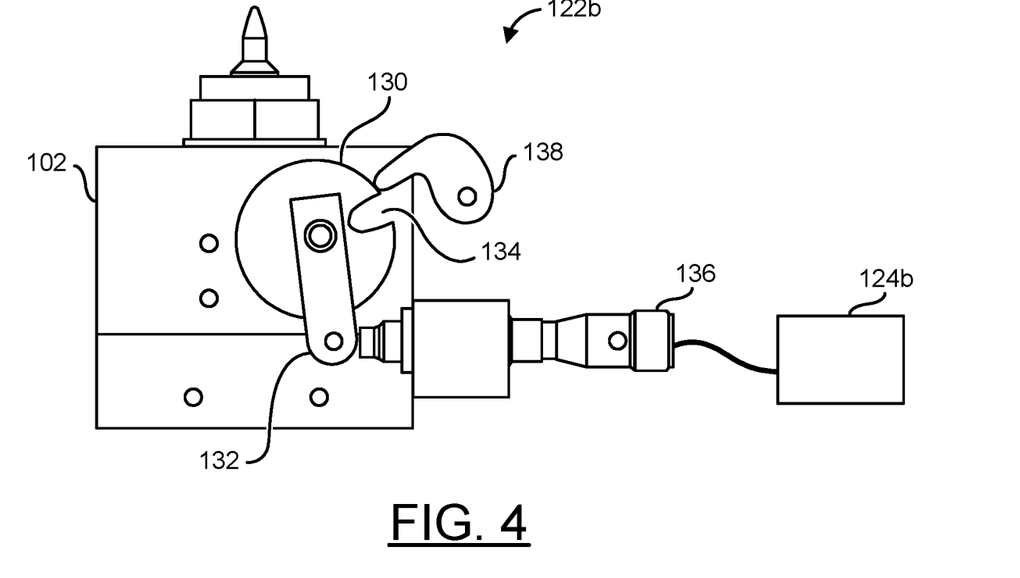
FIG. 4 is a diagram of an electro-mechanical angle sensor.

Referring to FIG. 4, a diagram of an example implementation of an electro-mechanical angle sensor 122b is shown. The sensor 122b may be a variation of the sensors 122 and/or 122a. The sensor 122b may be mounted to the housing 102. The sensor 122b may be in electrical communication with a circuit 124b. The circuit 124b may be a variation of the circuits 124 and/or 124a.

The sensor 122b generally comprises a wheel (or disk) 130, an arm (or lever) 132, a detent 134 in the wheel 130, a contact switch (or relay) 136 and a latch (or limit switch) 138. The wheel 130 may be coupled, indirectly connected, or directly connected to the shaft 114a. The circuit 124b may be operational to provide the status indications to the weld control circuit based on the measured angle value, similar to the circuit 124.

As the location pin 104 is pushed into the housing 102, the wheel 130 may be turned by the shaft 114a. In some embodiments, the arm 132 may be designed to press the contact switch 136 if the distance traveled by the location pin 104 indicates a present and properly oriented fastener 90. The circuit 124b may electrically sense a change in the contact switch 136 from unpressed to pressed. While the contact switch 136 is pressed, the circuit 124b may communicate to the weld control circuit that the fastener 90, the object 92 and the weld head 116 combination are in a correct orientation to be welded. While the contact switch 136 is unpressed, the circuit 124b may communicate to the weld control circuit that at least one of the fastener 90, the object 92 and/or the weld head 116 combination is not ready for the weld process to take place.

A length from the center of rotation of the shaft 114a to an outer end of the arm 132 may be greater than a length of the lever 112 (FIG. 1). The longer length of the arm 132 may provide a mechanical amplification of the distance Z that the location pin 104 is moved. A small movement of the location pin 104 may be translated into a larger linear movement of the contact switch 136 allowing for a more precise sensing of where the location pin 104 is positioned.

In other embodiments, the detent 134 and the latch 138 may be designed such that the detent 134 and the latch 138 are aligned with each other when the fastener 90, the object 92 and the weld head 116 combination are in a correct orientation to be welded. The circuit 124b may be configured to electrically monitor the latch 138 to detect an aligned condition and a not align condition between the detent 134 and the latch 136. When aligned, the circuit 124b may communicate to the weld control circuit that the welding process may take place. The circuit 124b may be configured to treat a non-aligned condition between the detent 134 and the latch 138 as an indication that at least one of the fastener 90, the object 92 and/or the weld head 116 combination is not ready for the weld process to take place.

Figure 5:
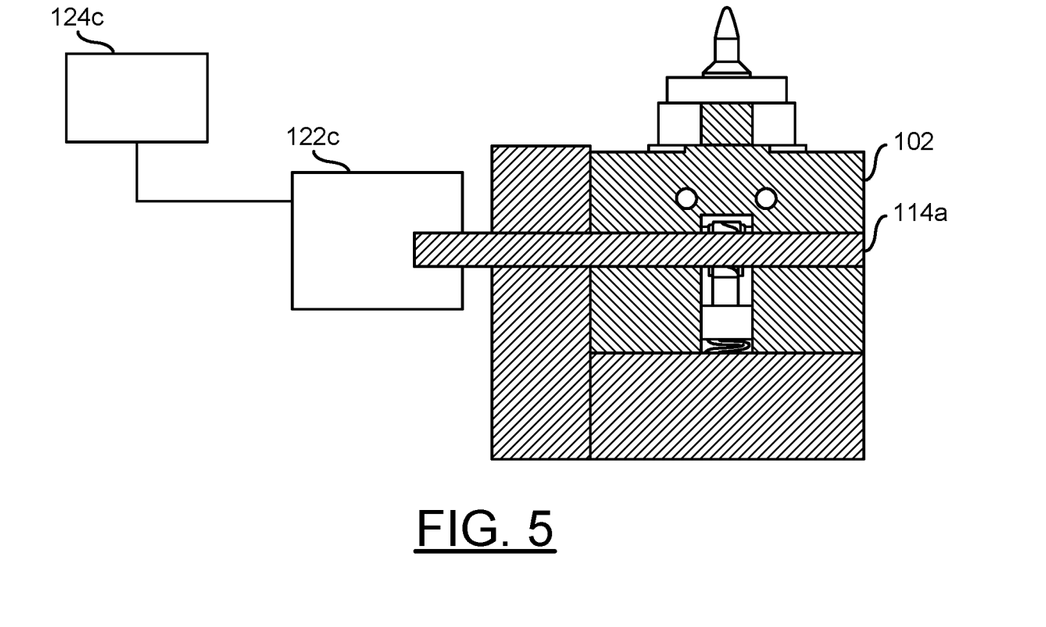
FIG. 5 is a cross-sectional view of an optical angle sensor.

Referring to FIG. 5, a cross-sectional view of an example implementation of an optical angle sensor 122c is shown. The sensor 122c may be a variation of the sensors 122, 122a and/or 122b. The sensor 122c may be mounted to the housing 102. The sensor 122c may be in electrical communication with a circuit 124c. The circuit 124c may be a variation of the circuits 124, 124a and/or 124b.

The sensor 122c may be directly or indirectly coupled or connected to the shaft 114a. An electrical signal generated by the sensor 122c may be proportional to an angle (absolute or relative) of the shaft 114a. The electrical signal generated by the sensor 122c may be received by the circuit 124c. The circuit 124c may examine the signal to determine if the fastener 90, the object 92 and the weld head 116 are properly aligned for the welding process to begin. Based on the angle value received in the electrical signal, the circuit 124c may determine that one or more of the fastener 90, the object 92 and/or the weld head 116 are not ready for welding. The circuit 124c may report the ready/not ready/missing part/ wrong part determination to the weld control circuit. The circuit 124c may be operational to provide the status indications to the weld control circuit based on the measured angle value, similar to the circuit 124.

Figure 6:
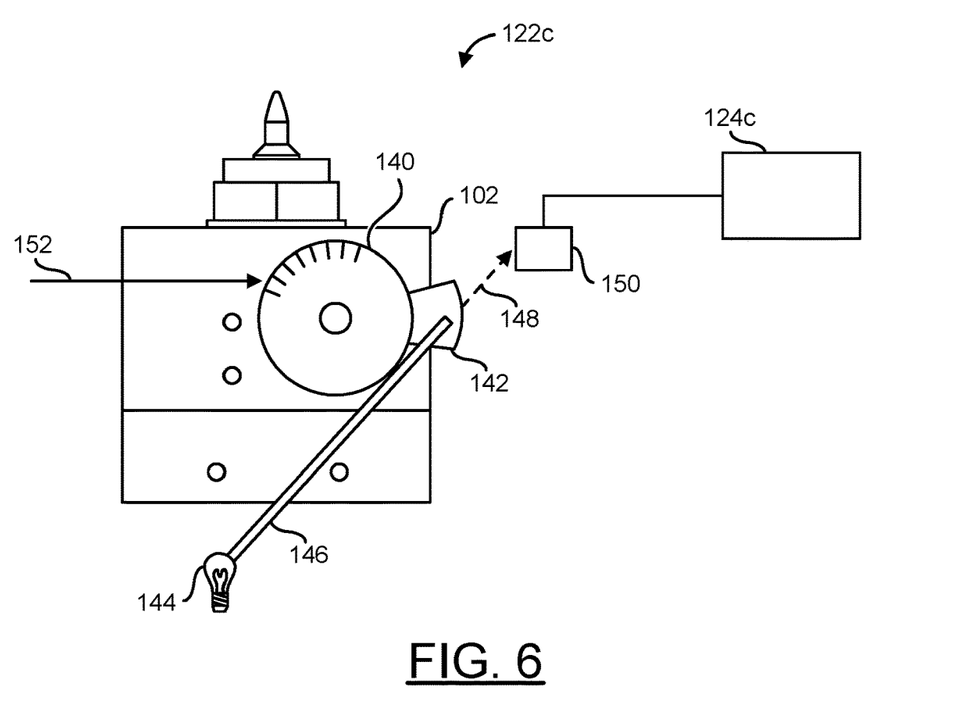
FIG. 6 is a detailed diagram of the optical angle sensor.

Referring to FIG. 6, a detailed diagram of an example implementation of the sensor 122c is shown. The sensor 122c generally comprises an extension (or wheel) 140, a shutter (or block) 142, a light source 144 that shines a light beam 146 toward a light sensor 150. The shutter 142 may be aligned along an outer edge of the extension 140 to prevent the light beam 146 from reaching the light sensor 150 at some angles (as shown). The shutter 142 may permit the light beam 146 to reach the light sensor 150 along a path 148 at other angles. The extension 140 may be coupled (or indirectly connected or directly connected) to the shaft 114a.

The circuit 124c may receive an electrical signal from the light sensor 150. The electrical signal may indicate that the light bean 146 has either reached the sensor 150 or is blocked by the shutter 142. Before the location pin 104 engages the fastener 90, the light beam 146 may reach the light sensor 150. The circuit 124c may monitor the light sensor 150 and communicate to the weld control circuit that the welding process should be inhibited. Where the location pin 104, the fastener 90 and the object 92 are present and properly aligned, the extension 140 may rotate the shutter 142 into the light beam 146 (as shown) to prevent the light beam 146 from reaching the light sensor 150. The circuit 124c may sense the change in the electrical signal generated by the now-dark light sensor 150 and communicate to the weld control circuit that the welding process may proceed. If the location pin 104 travels too far, the light beam 146 may become unblocked by the shutter 142. The light sensor 150 may convey the illumination to the circuit 124c. The circuit 124c may communicate to the weld control circuit that something is wrong with the faster 90, the object 92 and/or the location pin 104. The weld control circuit may inhibit the welding process in such situations. In various embodiments, the shutter 142 may be configured such that the light bean 146 reaches the light sensor 150 only when the faster 90, the object 92 and the location pin 104 are properly positioned for welding, and block the light beam 146 otherwise.

A length from the center of rotation of the shaft 114a to a point on the shutter 142 that engages the light beam 146 may be greater than a length of the lever 112 (FIG. 1). The longer length may provide a mechanical amplification of the distance Z that the location pin 104 is moved. A small movement of the location pin 104 may be translated into a larger angular movement of the shutter 142 allowing for a more precise sensing of where the location pin 104 is positioned.

The extension 140 may include markings 152. The markings 152 may provide a visual indication of the position of the location pin 104 relative to the housing 102. The visual indication may be used by an operator of the welding assembly to verify that the fastener 90, the object 92 and the weld head 116 are ready or not ready for the welding process to begin.

Figure 7:
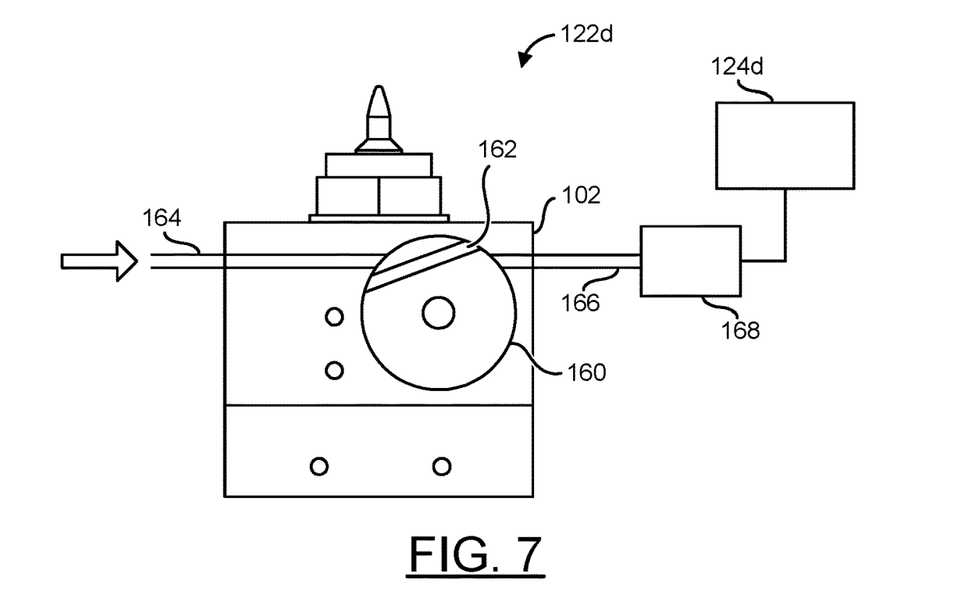
FIG. 7 is a diagram of a pneumatic angle sensor.

Referring to FIG. 7, a diagram of an example implementation of a pneumatic angle sensor 122d is shown. The sensor 122d may be a variation of the sensors 122, 122a, 122b and/or 122c. The sensor 122d may be mounted to the housing 102. The sensor 122d may be in electrical communication with a circuit 124d. The circuit 124d may be a variation of the circuits 124, 124a, 124b and/or 124c.

The sensor 122d generally comprises a wheel (or disk) 160, a tube (or bore) 162 through the wheel 160, an input tube (or pipe) 164, an output tube (or pipe) 166 and a pressure sensor 168. An open end of the input tube 164 may receive a pressurized fluid or gas. The pressure sensor 168 may generate a pressure value proportional to a pressure in the output tube 166. The pressure value may be conveyed from the pressure sensor 168 to the circuit 124d in an electrical signal. The circuit 124d may be operational to provide the status indications to the weld control circuit based on the measured pressure value, similar to the circuit 124.

Before the location pin 104 engages the fastener 90, the tube 162 may block the pressure in the input tube 164 from reaching the pressure sensor 168 via the output tube 166. The circuit 124*d* may monitor the pressure sensor 168 and communicate to the weld control circuit that the welding process should be inhibited. Where the location pin 104, the fastener 90 and the object 92 are present and properly aligned, the wheel 160 may rotate the tube 162 into alignment with the input tube 164 and the output tube 166. The rotation effectively opens a valve formed by the wheel 160 and the tubes 162, 164 and 166. The circuit 124*d* may sense the change in the pressure value in the electrical signal generated by the pressure sensor 168 and communicate to the weld control circuit that the welding process may proceed. If the location pin 104 travels too far, the tube 162 may rotate out of alignment with the tubes 164 and 166. The pressure sensor 168 may convey the reduced pressure to the circuit 124*d*. The circuit 124*d* may communicate to the weld control circuit that something is wrong with the faster 90, the object 92 and/or the location pin 104. The weld control circuit may inhibit the welding process in such situations.

Figure 8:
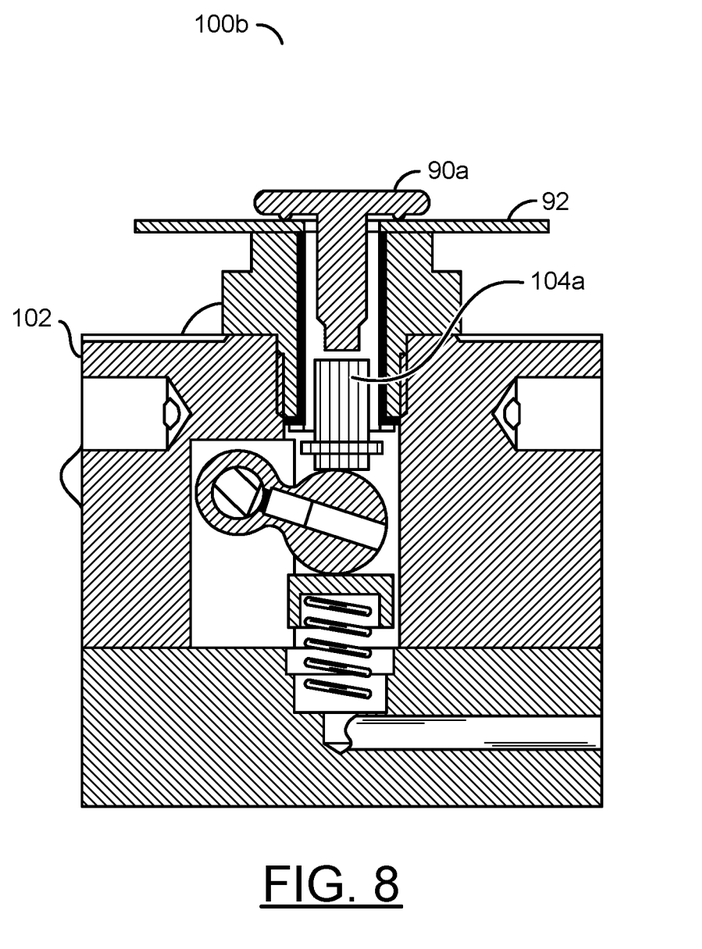
FIG. 8 is a cross-sectional view of another apparatus.

Referring to FIG. 8, a cross-sectional view of an example implementation of an apparatus 100*b* is shown. The apparatus 100*b* may be a variation of the apparatus 100 and/or the apparatus 100*a*. The apparatus 100*b* may be used to weld a weld stud (or part) 90*a* to the object 92. To account for different geometries between the weld stud 90*a* and the fastener 90, the apparatus 100*b* may include a push pin 104*a* in place of the location pin 104. Operation of the apparatus 100*b* may be similar to that of the apparatus 100 and/or the apparatus 100*a*. Other elements of the apparatus 100 and/or the apparatus 100*a* may be included in the apparatus 100*b*.

Figure 9:
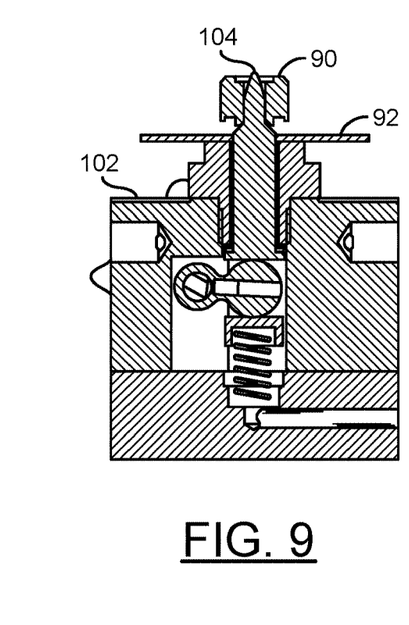
FIG. 9 is a cross-sectional view of a load position.

Referring to FIG. 9, a cross-sectional view of the fastener 90 in a load position is shown. In the load position, the location pin 104 may be pushed (or biased) to a maximum distance out of the housing 102. The fastener 90, if present, may be in contact with the location pin 104 but does not apply any force to the location pin 104. If the fastener 90 is missing, the location pin 104 may also be pushed (or biased) to the maximum distance out of the housing 102. In the load position, the sensor 122 (or 122*a*, 122*b*, 122*c* or 122*d*) may be monitored by the respective circuit 124 (or 124*a*, 124*b*, 124*c* or 124*d*). The circuit 124 may report to the weld control circuit that the welding process should be inhibited.

Figure 10:
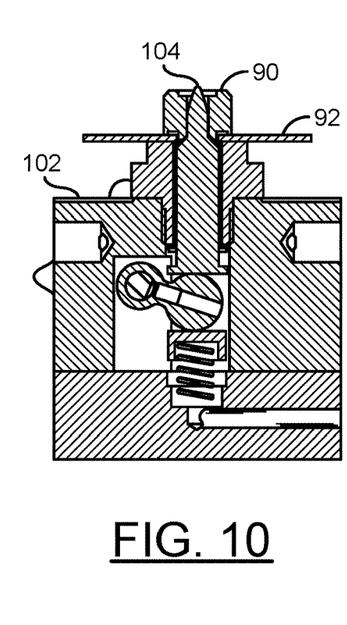
FIG. 10 is a cross-sectional view before welding.

Referring to FIG. 10, a cross-sectional view before welding is shown. The fastener 90 may be in contact with the object 92. The location pin 104 may be moved a predetermined (or anticipated) distance into the housing 102. In the before welding position, the sensor 122 (or 122*a*, 122*b*, 122*c* or 122*d*) may be monitored by the respective circuit 124 (or 124*a*, 124*b*, 124*c* or 124*d*). The circuit 124 may report to the weld control circuit that the welding process may begin.

Figure 11:
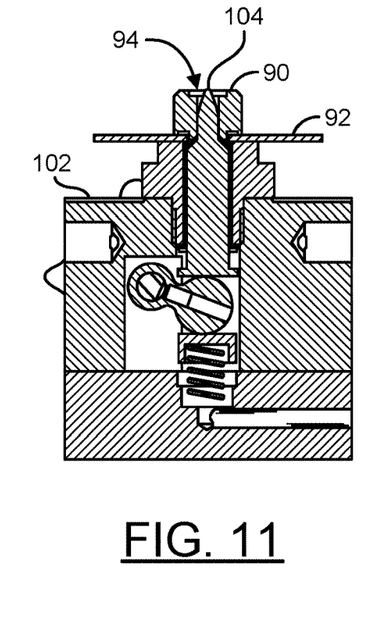
FIG. 11 is a cross-sectional view after the welding.

Referring to FIG. 11, a cross-sectional view after the welding is shown. The fastener 90 may move slightly closer to the object 92 as protrusions on a bottom of the fastener 90 melt and weld the fastener 90 to the object 92. The location pin 104 may move the slight distance further into the housing 102. In the after welding position, the sensor 122 (or 122*a*, 122*b*, 122*c* or 122*d*) may be monitored by the respective circuit 124 (or 124*a*, 124*b*, 124*c* or 124*d*). The circuit 124 may report to the weld control circuit that the welding process was successful.

Figure 12:
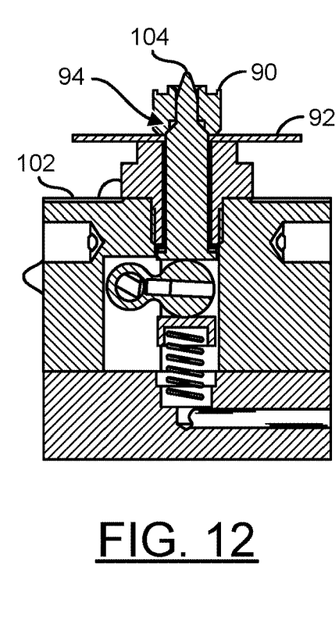
FIG. 12 is a cross-sectional view with an upside down fastener.

Referring to FIG. 12, a cross-sectional view with an upside down fastener 90 is shown. Where the fastener 90 is turned upside down relative to the object 92, the location pin 104 may be moved an improper distance into the housing 102. The improper distance may be different from the predetermined distance due to a geometry difference on opposing sides of the fastener 90. For example, a top side of the fastener 90 (e.g., the side normally facing away from the object 92), may include a beveled inside edge (also see FIG. 11). If the fastener 90 is upside down, the beveled inside edge 94 may allow the location pin 104 to protrude a further distance out of the housing 102 than would normally be expected. The circuit 124 may monitor the further distance and communicate to the weld control circuit to inhibit the welding process because the fastener 90 is mis-oriented.

Figure 13:
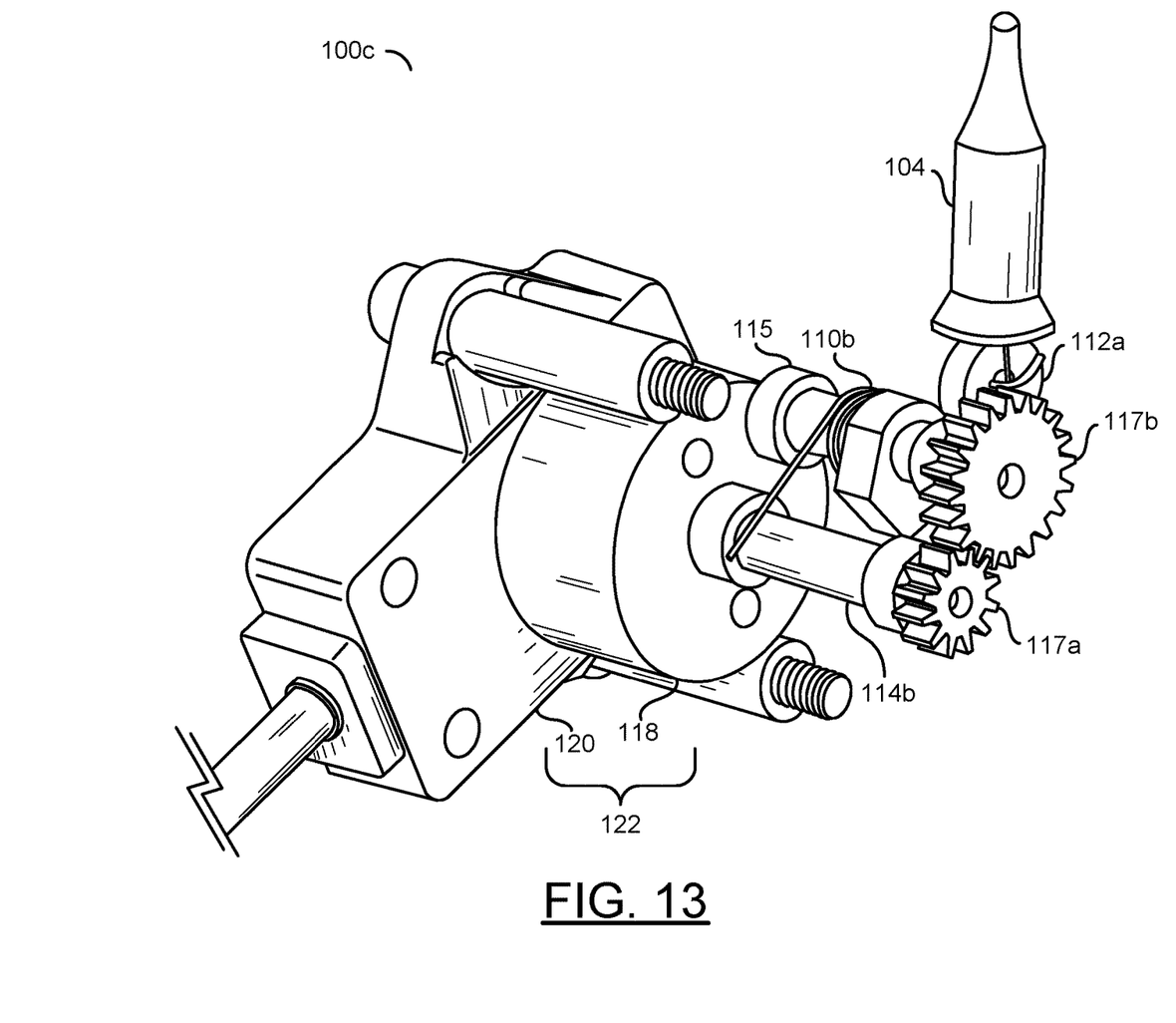
FIG. 13 is a perspective view of another apparatus.

Referring to FIG. 13, a perspective view of an example implementation of an apparatus 100*c* is shown. The apparatus 100*c* may be a variation of the apparatus 100, the apparatus 100*a* and/or the apparatus 100*b*. The apparatus 100*c* may be used to weld a fastener 90 (shown) and/or a weld stud 90*a* to the object 92. The apparatus 100*c* may include one or more sets of gears configured to increase an angular displacement of the sensors 122, 122*a*, 122*b*, 122*c* and/or 122*d* to provide better location measurements. Operation of the apparatus 100*c* may be similar to that of the apparatus 100, the apparatus 100*a* and/or the apparatus 100*b*.

The apparatus 100*c* generally includes the housing 102, the location pin 104, a spring (or assembly) 110*b*, a rotary lever (or arm) 112*a*, the shaft 114*b*, a shaft (or rod) 115, multiple gears 117*a*-117*b* and the sensor 122 (e.g., the rotary indicator 118 and the rotary indicator 120). The spring 110*b* (e.g., a rotary spring) may be a variation of the spring 110*a*. The spring 110*b* may be wound around the shaft 115 and anchored at a fixed location (e.g., the shaft 114*b*). The rotary lever 112*a* may be a variation of the rotary lever 112. Other elements of the apparatus 100, the apparatus 100*a* and/or the apparatus 100*b* may be included in the apparatus 100*c*.

The rotary lever 112*a* may be connected to the shaft 115 at one end and engages the location pin 104 at an opposite end. The linear motion of the location pin 104 may be converted (or translated) into an angular motion of the rotary lever 112*a* about the shaft 115. A center of rotation of the shaft 114*b* is generally offset from a centerline of the location pin 104.

The shaft 114*b* and the shaft 115 may be aligned to rotate on parallel axises. A gear 117*a* may be connected to an end of the shaft 114*b* opposite the rotary indicator 118. Another gear 117*b* may be connected to an end of the shaft 115. The gears 117*a*-117*b* may mesh such that rotation of the gear 117*b* causes a rotation of the gear 117*a*. A gear ratio in a range of 1.4:1 to 1.8:1 (e.g., 1.6:1) may cause the shaft 114*b* to turn at a faster rate as the shaft 115. Other gear ratios and/or numbers of gears may be implemented to meet the design criteria of a particular application.

Figure 14:
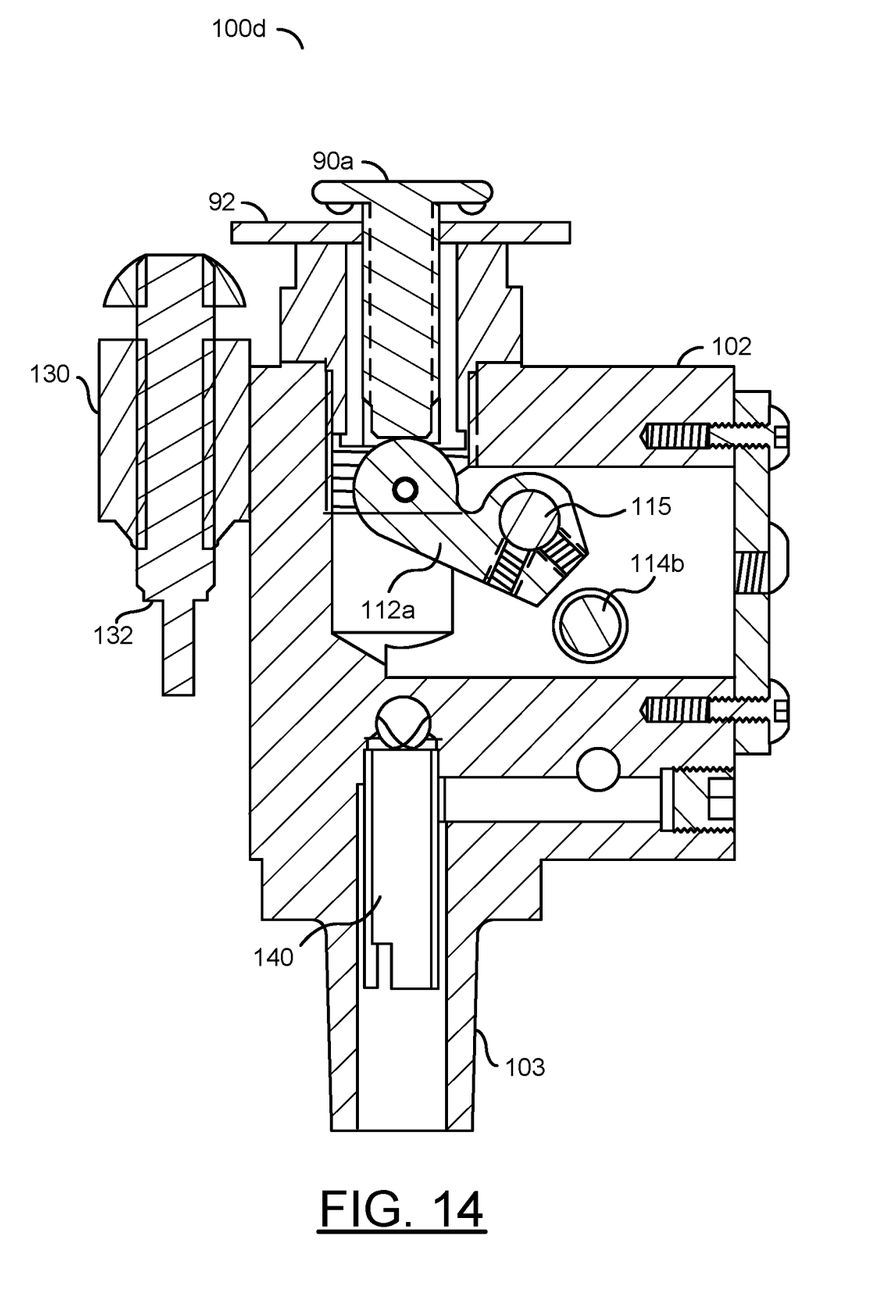
FIG. 14 is a cross-sectional view of still another apparatus.

Referring to FIG. 14, a cross-sectional view of an example implementation of an apparatus 100*d* is shown. The apparatus 100*d* may be a variation of the apparatus 100, the apparatus 100*a*, the apparatus 100*b* and/or the apparatus 100*c*. The apparatus 100*d* may be used to weld a fastener 90 and/or a weld stud 90*a* (shown) to the object 92. The apparatus 100*d* may also include one or more sets of gears configured to increase an angular displacement of the sensors 122, 122*a*, 122*b*, 122*c* and/or 122*d* to provide better location measurements. Operation of the apparatus 100*d* may be similar to that of the apparatus 100, the apparatus 100*a*, the apparatus 100*b* and/or the apparatus 100*c*.

The apparatus 100*d* generally includes the housing 102, a taper feature 103, the rotary spring 110*b*, the rotary lever 112a, the shaft 114b, the shaft 115, the gears 117a-117b, the sensor 122, a mount (or bracket) 130, a sensor (or device) 132 and a tube 140. Other elements of the apparatus 100, the apparatus 100a, the apparatus 100b and/or the apparatus 100c may be included in the apparatus 100d.

The taper feature 103 may be located at a bottom of the housing 102. The taper feature 103 may have a standard shape that allows the assembly 100d to be mounted on a welding machine. The taper feature 103 may be included on any of the assemblies 100, 100a, 100b, 100c and/or 100d.

The mount 130 may implement a sensor mount. The sensor mount 130 is generally configured to hold the sensor 132 in a specified location relative to the housing 102.

The sensor 132 may implement a spring loaded sensor. The spring loaded sensor 132 is generally operational to determine when the assembly 100d has a specified position relative to the object 92. In various embodiments, the sensor 132 may aid the weld control circuit to determine if a weld should proceed or not. If the sensor 132 detects the presence of the object 92 and the sensor 122 detects a proper positioning of the weld stud 90a, the welding may be performed. If the sensor 132 detects an improper location of the object 92, the welding may be inhibited even though the sensor 122 indicates proper placement of the weld stud 90a.

The tube 140 may implement a water tube. The water tube 140 may provide a flow of cooling water through the housing 102 to aid in drawing heat away from the assembly 100d. In various embodiments, the tube 140 may implement an air tube configured to provide a flow of cooling air (or other gas) through the housing 102 to aid in drawing heat away from the assembly 100d.

The functions and structures illustrated in the diagrams of FIGS. 1-14 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a housing configured to receive a weld head;
    a mechanism attached to said housing and configured to convert a position of a location pin relative to said housing into an angular rotation;
    a sensor coupled to said mechanism and configured to generate a value representative of said position of said location pin based on said angular rotation, wherein said value representative of said position of said location pin indicates that a part to be welded is selectively one of (i) in a proper orientation and (ii) in an improper orientation; and
    a plurality of gears connected between said mechanism and said sensor and configured to increase said angular rotation prior to said sensor.

2. The apparatus according to claim 1, wherein said mechanism comprises (i) a lever in contact with said location pin and (ii) a shaft coupled to said sensor.

3. The apparatus according to claim 1, wherein said plurality of gears are configured to provide a gear ratio of at least 1.4 to 1.

4. The apparatus according to claim 1, wherein said value representative of said position of said location pin indicates that said part to be welded is missing.

5. The apparatus according to claim 1, wherein said sensor is one of (i) a mechanical angle sensor, (ii) an optical angle sensor and (iii) a pneumatic angle sensor.

6. The apparatus according to claim 1, wherein said sensor is further configured to generate an electrical signal that conveys said value.

7. The apparatus according to claim 1, wherein said sensor comprises a visual indicator configured to show that the part, an object and said weld head are properly positioned for a welding process to begin.

8. The apparatus according to claim 1, wherein said mechanism and said sensor are immune to an electromagnetic field generated by said weld head.

9. The apparatus according to claim 1, wherein said apparatus forms part of a welding electrode.

10. A method for position sensing in a welding electrode, comprising the steps of:
    converting a position of a location pin relative to a housing into an angular rotation, wherein said housing is configured to receive a weld head;
    sensing a value representative of said position of said location pin based on said angular rotation, wherein said value representative of said position of said location pin indicates that a part to be welded is selectively one of (i) in a proper orientation and (ii) in an improper orientation; and
    increasing said angular rotation prior to said sense of said value.

11. The method according to claim 10, wherein said conversion is performed by (i) a lever in contact with said location pin and (ii) a shaft coupled to a sensor.

12. The method according to claim 10, wherein said increase in said angular rotation is by a factor of at least 1.4.

13. The method according to claim 10, wherein said value representative of said position of said location pin indicates that said part to be welded is missing.

14. The method according to claim 10, wherein said sense is one of (i) a mechanical angle sensing, (ii) an optical angle sensing and (iii) a pneumatic angle sensing.

15. The method according to claim 10, wherein said sense comprises generating an electrical signal that conveys said value.

16. The method according to claim 10, further comprising the step of:
    generating a visual indicator configured to show that the part, an object and said weld head are properly positioned for a welding process to begin.

17. The method according to claim 10, wherein a determination of said position is immune to an electromagnetic field generated by said weld head.

18. The method according to claim 10, wherein said method is performed in said welding electrode.

* * * * *